United States Patent [19]

Klinginsmith, III

[11] Patent Number: 4,787,150

[45] Date of Patent: Nov. 29, 1988

[54] FIXTURE FOR CHECKING THE ALIGNMENT OF A LOADWHEEL WITH THE SPINDLE OF A TIRE UNIFORMITY MACHINE

[75] Inventor: Neill W. Klinginsmith, III, Clinton, Ohio

[73] Assignee: The Firestone Tire & Rubber Company, Akron, Ohio

[21] Appl. No.: 104,605

[22] Filed: Oct. 5, 1987

[51] Int. Cl.$^4$ ............................................. G01B 5/255
[52] U.S. Cl. ................................... 33/552; 33/203.16; 33/645
[58] Field of Search ................. 33/552, 549, 550, 554, 33/553, 530, 203.18, 203.19, 203.2, 203.16, 203.17, 645

[56] References Cited

U.S. PATENT DOCUMENTS

| | | | |
|---|---|---|---|
| 1,977,297 | 10/1934 | Weaver | 33/203.16 |
| 3,315,366 | 4/1967 | Marshall | 33/203.16 X |
| 3,581,403 | 6/1971 | Tuttle | 33/203.16 |
| 4,126,942 | 11/1978 | Damman | 33/203.16 X |

Primary Examiner—William D. Martin, Jr.
Attorney, Agent, or Firm—Ernst H. Ruf

[57] ABSTRACT

A fixture for measuring the alignment of a loadwheel with respect to the centerline spindle of a tire uniformity machine. An adaptor block is formed with a conical-shaped recess and an opposed conical-shaped projection which mates with a complementary shaped nose cone and sleeve of a chuck assembly when the block is clamped therein. A bar extending parallel to the aligned centerlines of the block and spindle has a pair of sensors mounted on its ends which register on the uncoated surfaces adjacent the edges of the loadwheel. Readings from the sensors indicate the parallelism of the loadwheel to the spindle. Another sensor can be mounted on the bar and engage the bottom edge of the loadwheel at two locations to determine the squareness of the loadwheel with respect to the spindle. Another sensor can be mounted on the bar to measure the circumferential profile of the coated surface of the loadwheel. The fixture avoids removal of the chuck assembly or the dismantling of other machine components. The fixture may be mounted on a sled to facilitate the placement of the adaptor block on the chuck assembly.

28 Claims, 3 Drawing Sheets

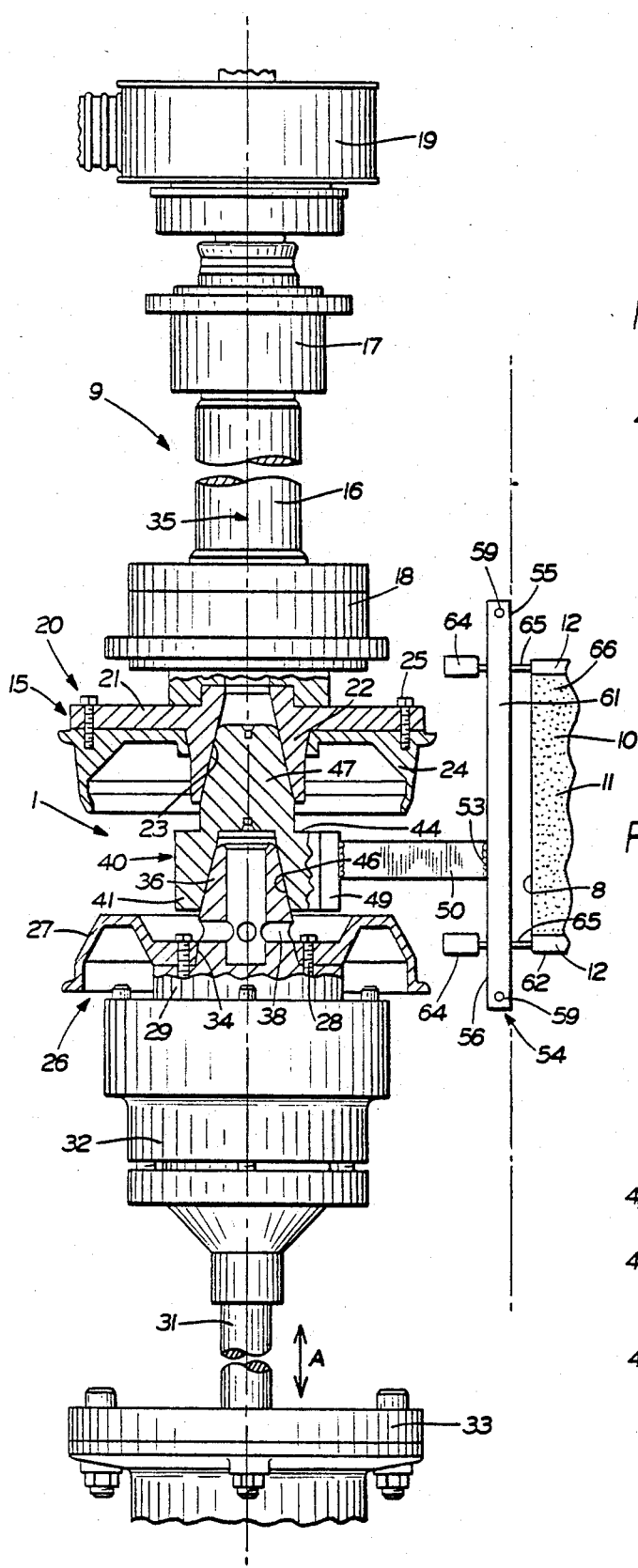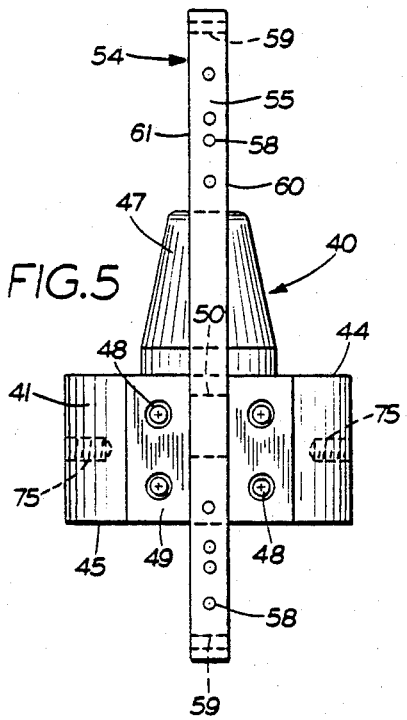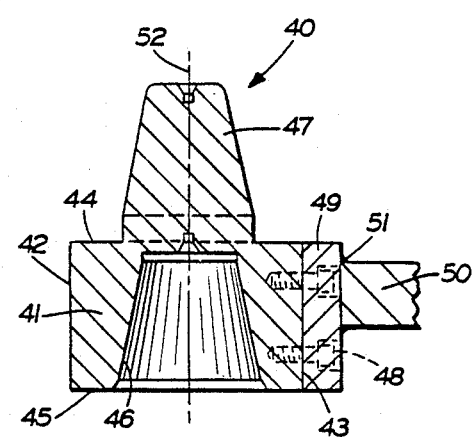

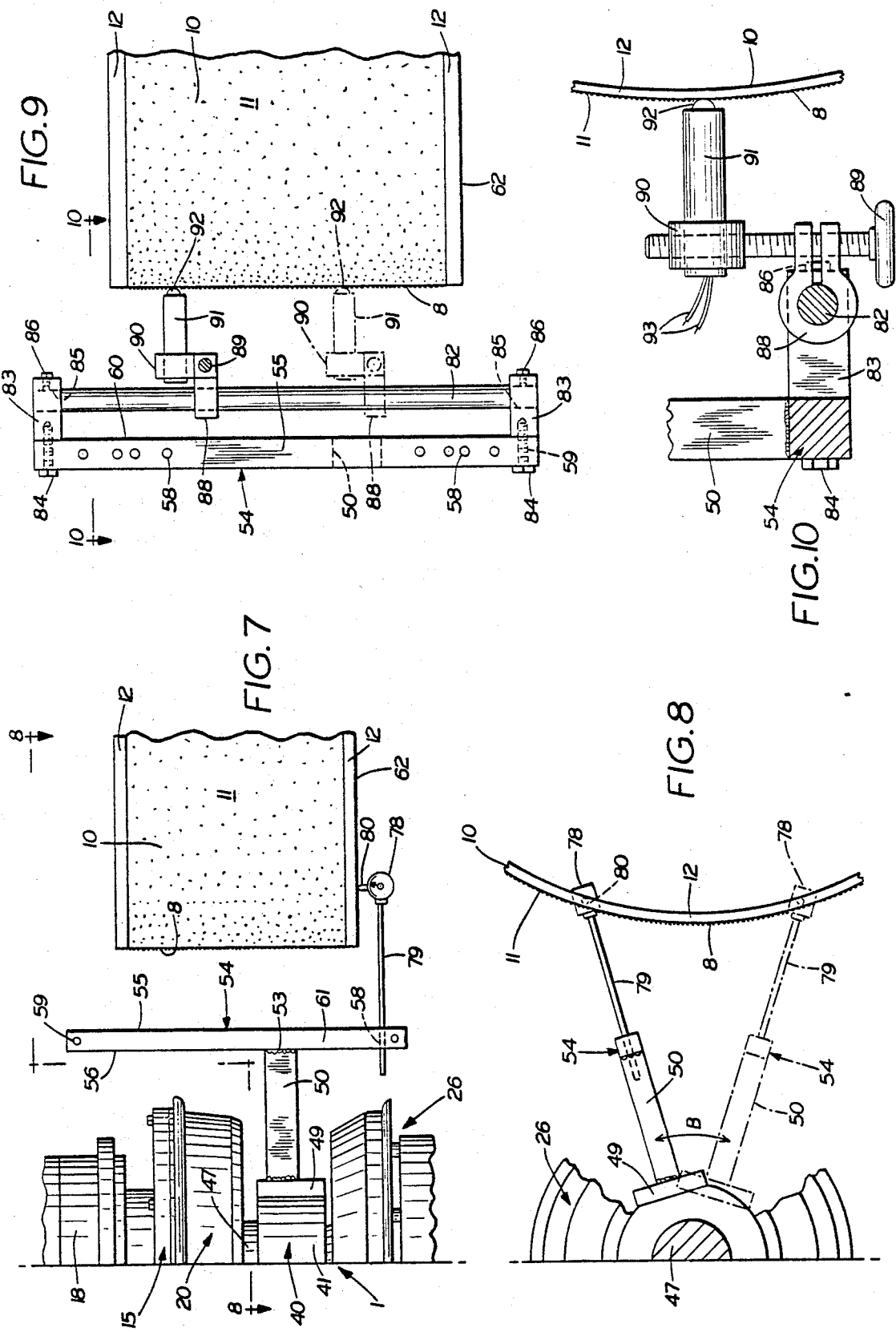

FIXTURE FOR CHECKING THE ALIGNMENT OF A LOADWHEEL WITH THE SPINDLE OF A TIRE UNIFORMITY MACHINE

TECHNICAL FIELD

The invention relates to test equipment and in particular to a device for mounting on the chuck assembly of a tire uniformity machine for checking the parallelism and squareness of a loadwheel with respect to a centerline spindle of the machine without removing the chuck assembly. More particularly, the invention relates to such a test fixture which self-aligns itself automatically on the chuck assembly when clamped therebetween and which supports measurement sensors for engaging the outer surface and edges of the loadwheel.

BACKGROUND ART

Tire uniformity machines, also referred to as tire uniformity optimizers (TUO) or tire uniformity graders (TUG), have been developed and are used in the tire industry for accurately measuring and grading the radial and lateral force variations, conicity and ply steer found within a cured tire. It also has the ability to analyze test data and to correct for certain nonuniformities in the tire. These machines consist of a load carrying structure, precision rims and a loadwheel. Top and bottom rims hold and rotate the tire and the loadwheel, which is mounted on loadcells, applies force to the inflated tire and detects force variations in the tire. The loadcells provide signals and test results to an operator of the machine to indicate the condition of the tire and to take corrective measures if possible. The readouts from the loadcell provide very accurate measurements of tire characteristics. The accuracy of these measurements is based upon the correct parallelism and squareness of the machine spindle with the circumferential surface of the loadwheel. After a certain number of operations it is necessary to recheck the parallelism and squareness of the loadwheel with respect to the machine spindle to insure continued accuracy of the readouts. However, monitoring minor adjustments is required periodically to maintain this parallelism and squareness. Heretofore, in order to measure these parameters, the rims of the chuck assembly and spindle adaptor had to be removed and an alignment adaptor shaft was placed on the spindle shaft, and a single dial indicator was then moved between top and bottom of the loadwheel surfaces on the spindle shaft adaptor to obtain the alignment readings. However, a considerable amount of time and work was required for the removal of the chuck rims and placement of the spindle adaptor shaft on the spindle shaft in order to take the measurement readings. Another sensor then could be mounted on the spindle adaptor shaft for checking the squareness of the loadwheel with respect to the spindle shaft.

Since the dismantling of the machine, and in particular, components of the chuck assembly, is a relatively time consuming and tedious operation, the need exists for an improved device or fixture for accurately measuring the parallelism and squareness of a loadwheel circumferential surface with respect to the spindle assembly of a tire uniformity machine without requiring dismantling of the machine, yet without sacrificing accuracy of the alignment readings.

Various types of test apparatus and fixtures have been developed for insuring the alignment of various types of machines and equipment, examples of which are shown in the following patents.

U.S. Pat. No. 4,417,237 discloses an apparatus and method for detecting and indicating misalignment of vehicle wire spoke wheels wherein a circuit is mounted at the bottom part of the wheel and includes left and right misalignment sensors which detect misalignment of a portion of the rim when the rim is rotated.

U.S. Pat. No. 2,613,447 discloses a testing device for checking the alignment and the eccentricity of automobile wheels, axles and brake drums. A sensor wheel contacts the outer rim of the rotating member and rotates about a pivot to indicate any eccentricity on the member being tested.

U.S. Pat. No. 3,128,561 discloses an apparatus for measuring wheel alignment which uses a pair of rods attached to conductive brushes. An electrical meter is connected to the brushes and indicates the potential differences between two connections which are representative of the parallelism between the wheels.

U.S. Pat. No. 4,660,294 discloses a surface alignment apparatus having an upstream turbine wheel and a downstream turbine wheel positioned relative to a stepped shaft. The measurements taken between faces of the wheels are taken by extensometers which indicate parallelism of the two faces.

U.S. Pat. No. 2,929,147 discloses a device for checking dimensional variations or unevenness of surface portions of an annular article. The checking device includes contact members which are positioned to engage circumferentially spaced portions of the inner braking surface of the liner at a predetermined distance from each other. A gauge head is connected to a power unit which is electrically connected to a meter to detect variations in the article surfaces.

None of the above discussed prior art patents, or other known prior art, is believed to show or describe an alignment fixture which achieves these advantages of the present invention which is described in detail below.

DISCLOSURE OF THE INVENTION

Objectives of the invention include providing a loadwheel alignment fixture having a cup/cone adaptor block which is mounted between the upper and lower rims of a chuck mechanism of a tire uniformity machine without requiring removal of the rims or other portions of the chuck mechanism, and which eliminates the separate mounting of a spindle adaptor thereon as in prior test procedures.

Another objective is to provide such a fixture which is of a relatively simple structure, readily formed of a hardened metal adaptor block formed with a conical recess which seats on the nose cone of the lower rim of the chuck assembly of a tire uniformity machine and has a conical-shaped upper projection which seats into the nose cone sleeve of the upper rim of the chuck assembly, whereby an outer bar parallel to the centerline of the adaptor block will align with the centerline of the spindle when the adaptor block is clamped thereon by the chuck assembly.

A further objective of the invention is to provide such a fixture in which various types of sensors or gauges are mounted on the fixture for engagement with the uncoated surfaces of the loadwheel adjacent the edges thereof to provide simultaneous signals indicating the parallelism of the loadwheel force surface with respect to the spindle centerline enabling adjustments to be made and their effect immediately recognized; and in which another sensor can be mounted on the fixture and brought into engagement with the edge of the loadwheel to determine the squareness of the loadwheel with respect to the spindle centerline.

Still another objective is to provide such a fixture wherein a slide bar can be mounted on the sensor mounting bar for slidably mounting an LVDT or similar transducer thereon for checking the profile of the coated surface of the loadwheel. A further objective is to provide such a fixture which can be removably mounted on a lightweight aluminum sled for moving the fixture into and out of position between the spaced rims of the chuck mechanism facilitating the use of the fixture.

Another objective of the invention is to provide such an alignment fixture in which the adaptor block has a flat surface formed thereon parallel with the outer surface of the sensor attachment bar to allow certification of the fixture at various times to insure it is within the original manufacturing tolerances prior to placing it in a tire uniformity machine for use with the loadwheel.

A still further objective of the invention is to provide such a fixture which can be formed relatively inexpensively of a block of hardened metal, precision ground to the desired size and configuration, which is mounted on a T-shaped mounting bar with the outer arm component thereof functioning as the parallel sensor mounting arm, and in which the fixture is free of complicated and expensive moving parts subject to maintenance and breakage.

These objectives and advantages are obtained by the improved fixture of the invention, the general nature of which may be stated as a fixture for checking the alignment of a loadwheel of a tire uniformity machine with respect to the centerline of the spindle of said machine of the type having spaced first and second chucks for rotatably mounting a tire to be tested therebetween, in which the first chuck has a nose cone sleeve formed with a conical shaped recess and the second chuck has a conical-shaped nose cone; wherein said fixture includes an adaptor block having a conical-shaped projection on one end of the block and a conical-shaped recess formed in an opposite end of said block, said projection being complementary to and adapted to be inserted into the conical-shaped recess of the first chuck with said conical-shaped recess being complementary to and adapted to receive the nose cone of the second chuck when said chucks are moved towards each other to align a centerline of the adaptor block with the centerline of the spindle; a support bar mounted on the adaptor block and extending parallel with the centerline of the adaptor block; and sensor means mounted on the bar for engaging the loadwheel to measure the alignment of said loadwheel with respect to the centerline of the spindle.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 3 is an enlarged fragmentary elevational view of the spindle assembly of the tire uniformity machine of FIGS. 1 and 2, with portions of the chuck assembly shown in section and with the improved alignment fixture also shown partially in section, clamped thereon and mounting a pair of sensors checking the parallelism of a loadwheel;

FIG. 5 is an end elevational view of the improved alignment fixture;

FIG. 6 is a fragmentary sectional view of the adaptor block portion of the alignment fixture;

FIG. 7 is a diagrammatic view similar to FIG. 3 showing a sensor mounted on the alignment fixture checking the squareness of the loadwheel;

FIG. 8 is a fragmentary sectional view taken on line 8—8, FIG. 7;

FIG. 9 is a fragmentary side elevational view of the alignment fixture with a slide rod being mounted thereon supporting another sensor for measuring the circumferential profile of the loadwheel; and FIG. 10 is an enlarged sectional view taken on line 10—10, FIG. 9.

Similar numerals refer to similar parts throughout the drawings.

BEST MODE FOR CARRYING OUT THE INVENTION

Figure 4:
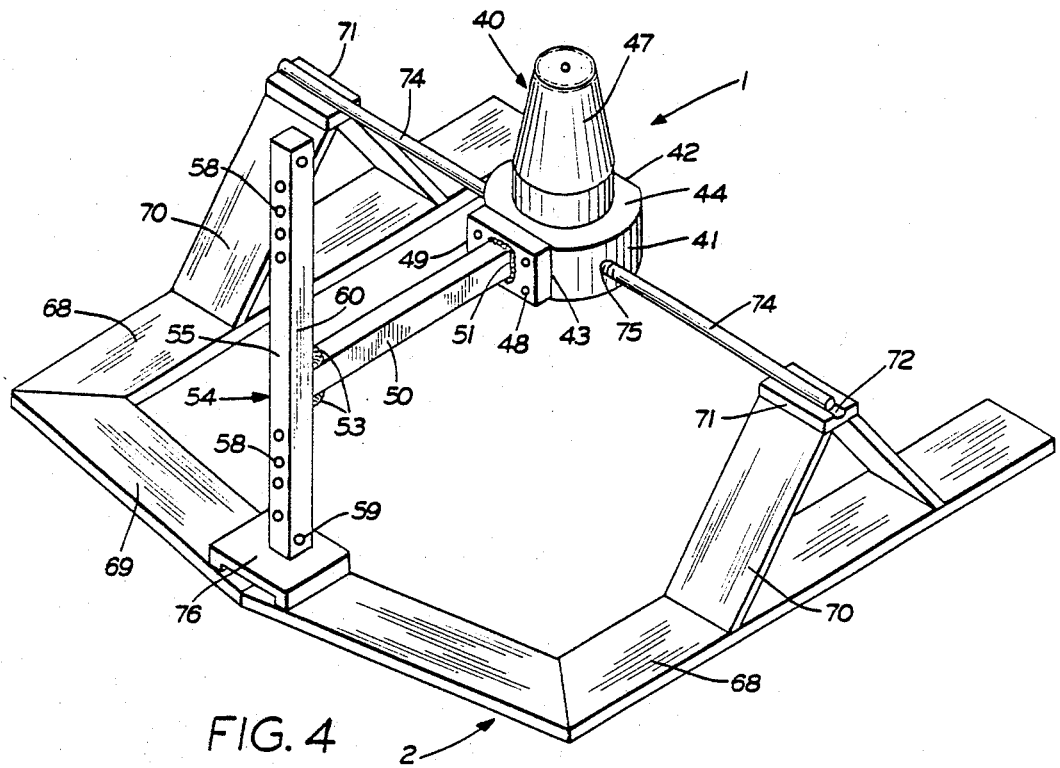
FIG. 4 is a perspective view of the improved alignment fixture mounted on a carrier sled.

The loadwheel alignment fixture of the invention is indicated generally at 1, and is shown particularly in FIG. 4, mounted on a transport sled indicated generally at 2. Fixture 1 is intended for use with a tire uniformity machine indicated generally at 3, and shown particularly in FIGS. 1 and 2. Machine 3 is of the type manufactured by Akron Standard Division of Eagle-Picher Industries, Inc., and identified as model 70. However, the alignment fixture of the invention is adaptable for use with other types of tire uniformity machines than the particular one described below and shown in FIGS. 1 and 2.

Machine 3 is of a usual design and accurately measures and grades the radial and lateral force variations, conicity and ply steer found within a cured pneumatic tire, indicated at 4. A tire handling system moves a tire through the machine and usually consists of two powered roller conveyors, indicated at 5 and 6, for moving a tire into position between upper and lower chucks (FIG. 3) of the tire uniformity machine. At the entrance of input conveyor 5, arms (not shown), are used to center the tire on the conveyor and permit the inlet of one tire at a time to the test section of the machine. At the exit, or output conveyor 6, arms also are used to hold the tire over a bead marker while the tire is marked and graded before the tire is released from the machine. The test section of machine 3 includes a main spindle assembly indicated generally at 9, which is shown in particular detail in FIG. 3.

Figure 2:
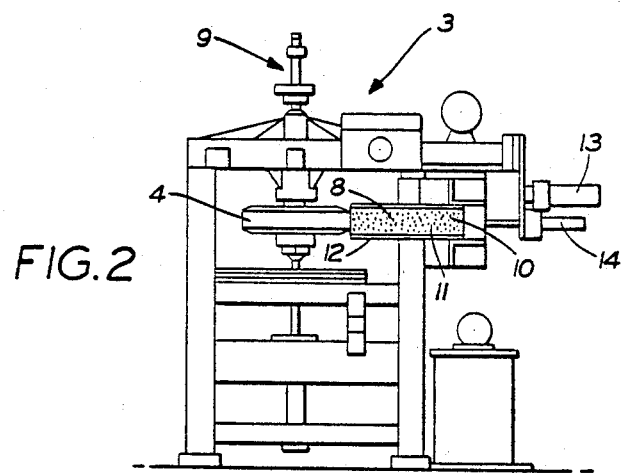
FIG. 2 is an end view of the tire uniformity machine of FIG. 1 showing a known loadwheel engaged with a tire rotatably mounted in the chuck assembly thereof.

Machine 3 includes a loadwheel 10 which is freely rotatably mounted on appropriate bearings and a shaft and has an outer surface 8, the majority of which is coated with a friction material, indicated at 11 in FIG. 3. The side edges 12 of loadwheel 10 preferably are uncoated and provide two smooth strips which are used to test the alignment of the loadwheel with respect to spindle assembly 9 as described below. Loadwheel 10 is moved horizontally into and out of engagement with a tire 4 mounted in spindle assembly 9 as shown in FIG. 2, by positioning mechanisms 13 and 14 shown diagrammatically in FIG. 2. Positioning mechanisms 13 and 14 which include a DC motor-driven ball screw, advances a loadwheel carriage so that the loadwheel engages the rotating tire and applies a radial load thereto. This load is operator selectable and enables the characteristics of the tire to be measured and displayed on appropriate equipment for operator review. A plurality of load cells are incorporated into the mounting mechanism for loadwheel 10 for performing and measuring various usual tests on tire 4.

Figure 1:
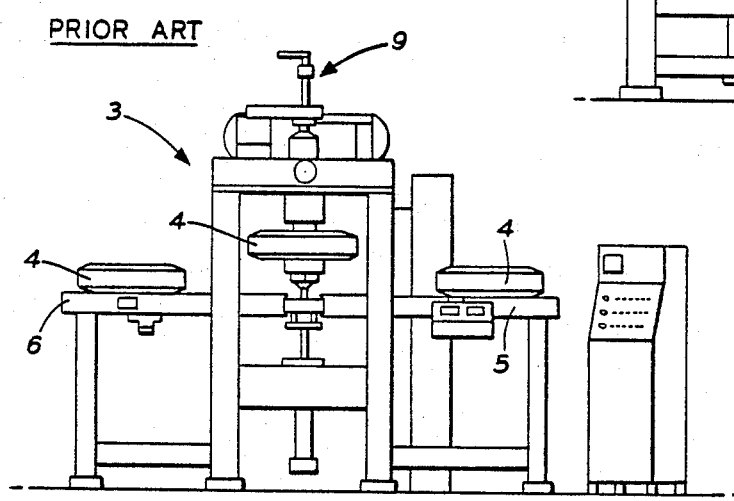
FIG. 1 is a diagrammatic side view of a prior art tire uniformity machine of the type with which the improved alignment fixture of the invention is intended for use.

FIG. 3 discloses a usual spindle assembly 9 of the type with which the improved fixture 1 is intended for use. Spindle assembly 9 includes a main shaft 16 rotatably supported in spaced bearings 17 and 18 and rotated by a drive gear assembly 19. An upper chuck indicated generally at 20, includes a spindle adaptor 15 consisting of an integrally connected nose-cone mounting plate 21 and a nose-cone sleeve 22. Sleeve 22 is provided with a conical-shaped inner recess 23. Plate 21 is securely mounted on shaft 16 for rotation with the shaft and has an upper rim 24 secured thereto by a plurality of bolts 25. A lower chuck indicated generally at 26, includes a lower rim 27 which is attached by bolts 28 to a base 29. Base 29 is rotatably supported on a support shaft 31 by a bearing assembly 32. Shaft 31 is mounted at its lower end in a support base 33 and is vertically movable as shown by arrow A to raise and lower chuck 26 with respect to upper chuck 20. Lower chuck 27 further includes a conical-shaped nose cone 36 which projects upwardly through a central opening 34 formed in rim 27. Nose cone 36 is conically shaped and is complementary with nose cone sleeve recess 23 so that the two members cooperate with each other for clamping a usual pneumatic tire 4 therebetween when performing tests thereon as shown in FIGS. 1 and 2. A plurality of air passages 38 are formed in nose cone 36 for admitting and exhausting pressurized air into and from a pneumatic tire 4 when clamped between rims 24 and 27 during testing.

The particular configuration and construction of spindle assembly 9 may vary, but most tire uniformity machines will include upper and lower rims 24 and 27 with cooperating nose cone 36 and nose cone sleeve 22. These are the main components of a tire uniformity machine with which the improved alignment fixture cooperates for achieving the results of the invention. The centerline of spindle assembly 9, indicated generally at 35, extends through the aligned centerlines of nose cone sleeve 22 and nose cone 36.

Fixture 1 is best illustrated in FIGS. 4, 5 and 6 and includes an adaptor block indicated generally at 40, formed of a one-piece precision ground hardened metal material. Block 40 has a generally cylindrical base 41 formed with opposed parallel flat front and rear surfaces 42 and 43 and parallel top and bottom surfaces 44 and 45.

In accordance with one of the features of the invention, a conical-shaped recess 46 is formed in base 41 and extends upwardly from bottom surface 45 (FIG. 6) and is complementary in shape and size to nose cone 36. Correspondingly, a conical-shaped projection 47 is formed integrally with base 41 and projects vertically upwardly from top surface 44 and is complementary with conical recess 23 of nose cone sleeve 22. A mounting plate 49 is attached by bolts 48 to flat rear surface 43 of base 41 (FIG. 6) and has a mounting arm 50 attached thereto by welds 51. Mounting arm 50 extends perpendicularly outwardly with respect to an imaginary common centerline 52 of recess 46 and projection 47 (FIG. 6).

The other end of arm 50 is attached by welds 53 to a sensor support bar indicated generally at 54, preferably at the mid-point of bar 54. Bar 54 preferably is square-shaped in cross-sectional configuration and has a flat outer surface 55 and an inner surface 56, with surface 55 being parallel with flat front surface 42 of adaptor block 40. A plurality of spaced horizontally extending holes 58 are formed in bar 54 generally adjacent the upper and lower ends thereof. Holes 58 extend horizontally in parallel alignment with mounting arm 50 and perpendicular to bar surface 55. A pair of holes 59 are formed adjacent the top and bottom ends of bar 54 and extend between end faces 60 and 61 of the bar, perpendicular to the direction of holes 58. The purpose and function of holes 58 and 59 are discussed further below.

Checking the parallelism of loadwheel 10 with fixture 1 is shown particularly in FIG. 3. Lower chuck 26 will be in a lowered position and sufficiently spaced from upper chuck 20 permitting adaptor block 40 to be placed on nose cone 36 by engagement of the nose cone within conical-shaped recess 46 of block 40. The appropriate machine controls are actuated raising lower chuck 26 by vertical movement of shaft 31, bringing conical shaped projection 47 of block 40 into engagement within complementary-shaped recess 23 of nose cone sleeve 22. The engagement of the complementary-shaped surfaces of the adaptor block with the conical surfaces of the upper and lower chucks will automatically align centerline 52 of adaptor block 40 with centerline 35 of spindle assembly 9. This alignment of the two centerlines will automatically align mounting arm 50 perpendicular to spindle centerline 35, and correspondingly will align support bar 54 parallel to spindle centerline 35 as shown in FIG. 3.

A pair of sensors 64 are mounted in a pair of the spaced holes 58 and have a sensing element 65 which extends outwardly therefrom, which engages the uncoated smooth surface strips 12 adjacent edges 66 of the loadwheel. Sensors 64 preferably are digital electronic indicators, such as of the type sold under the trademark MAXUM by Federal Products Corporation of Providence, R.I. If desired, sensors 64 can be usual contact dial indicators having a contact element which will actuate an indicating gauge on the sensor. Manual rotation of the clamped chuck assembly with fixture 1 therein, to position sensors 64 perpendicularly to the loadwheel surface, will provide measurements and readings to indicate the parallelism or non-parallelism of edge strips 12. Any misalignment can be corrected by adjustment of the loadwheel mounting mechanisms (not shown), which upon subsequent rotation of the loadwheel will indicate if sufficient correction has been made to insure that the face of the loadwheel is parallel with spindle centerline 35.

After completion of the parallelism test, the lower chuck is lowered and fixture 1 can be manually removed from between the upper and lower chucks. To facilitate the movement of fixture 1 into and from its position between the spaced chucks, carrier sled 2 may be utilized. Sled 2 preferably is formed of light weight aluminum having a pair of spaced runners 68 and a cross-member 69. A pair of support brackets 70 forming a V-shaped support, are mounted on each runner 68 and extend upwardly therefrom. A top support block 71 is mounted on each support bracket and is formed with a recess 72.

To removably support fixture 1 on sled 2 a pair of rods 74 may be threadably engaged in threaded holes 75 (FIGS. 4 and 5) formed in block base 41, the outer ends of which are seated in support block recess 72. A channel 76 preferably is attached to cross-member 69 for supporting the bottom end of support bar 54 as shown in FIG. 4. Thus, fixture 1 is loosely, movably supported on sled 2, whereby sled 2 can be placed on either the input or output conveyor for movement of adaptor block 40 between the spaced chucks. Sled 2 either remains in position adjacent spindle assembly 9 during the loadwheel test or can be easily removed after block 40 is clamped between the upper and lower chucks. Rod 74 may remain engaged in base 41 or removed easily therefrom during the test.

Fixture 1 may also be used to check the squareness of loadwheel 10 with respect to spindle assembly 9 as shown diagrammatically in FIGS. 7 and 8. Adaptor block 1 is clamped between the upper and lower chucks in the same manner as described above. An indicating gauge 78 is mounted on the end of a rod 79 which is fixed into a selected support bar hole 58 or may be mounted on a slide rod 82 which is described below, and extends outwardly therefrom. Bar 79 will extend parallel with mounting arm 50 and correspondingly perpendicular to spindle centerline 35. Gauge 78 will have a sensing element 80 which is brought into contact with peripheral edge 62 of loadwheel 10. Fixture 1 is then rotated through a predetermined angle indicated at B in FIG. 8 by rotation of the clamped chuck assemblies, bringing sensing element 80 to a second position on peripheral edge 62. The two readings at the spaced edge locations on the loadwheel will indicate the squareness of the loadwheel with respect to spindle assembly 9. Similar tests have been performed for determining the squareness of the loadwheel, but by different and more complicated prior art mechanisms than the use of fixture 1.

Fixture 1 may also be used for measuring the circumferential profile of coated surface 11 of loadwheel 10 as shown in FIGS. 9 and 10. A slide rod 82 is mounted parallel to support bar 54 by a pair of mounting blocks 83 which are secured to bar 54 by bolts 84. Slide rod 82 is fixed in end holes 85 formed in blocks 83 by set bolts 86. A clamp 88 is slideably mounted on slide rod 82 and secured in a clamped fixed position thereon by a threaded thumbwheel 89. A second clamp 90 is mounted on and operated by thumbwheel 89 and secures a sensor 91 therein which has a sensing element 92 at its outer end for engagement with surface 11.

Sensor 91 preferably is a transducer, and in particular an LVDT, and is connected by conductors 93 to appropriate recording mechanisms such as an indicating graph. A profile of coated surface 11 is obtained by a plurality of readings of surface 11 by incremental adjustments of bracket 90 along slide rod 82, two positions which are shown in FIG. 9. At each contact position the loadwheel will be rotated by a low speed motor at least one cycle followed by the subsequent repositioning of sensor 91 and rotation of the loadwheel. For example, readings will be taken at one inch increments along the circumference of coated surface 11 which will provide an accurate profile of the coated surface to enable refurbishing of the surface if necessary.

Accordingly, improved fixture 1 provides a device which automatically aligns with the centerline of the spindle assembly of a usual tire uniformity machine by the mutual engagement of the two complementary-shaped, preferably conical surfaces, with two conical-shaped recesses, which aligns a support bar having one or more sensors mounted thereon for measuring both the parallelism and squareness of the loadwheel with respect to the centerline of the spindle and, in addition, enables the profile of the coated loadwheel surface to be determined. Also, a carrier sled is provided to facilitate the placement and removal of the adaptor block between the spaced chucks of the spindle assembly, and in which the tests are performed without removing either of the tire mounting rims or spindle components as heretofore required with prior art alignment tests.

Outer flat face 42 of adaptor block 40 provides an easy method of certifying the alignment of the centerline of adaptor block 40 with support bar 54 to insure that the fixture is properly aligned when it is mounted on a spindle assembly for performing tests on the associated loadwheel. The precision grinding of surface 42 parallel with surface 43 and ultimately with the outer surface 55 of support bar 54, enables block surface 42 to be placed on a planar table surface and appropriate measurements performed on bar surface 55 to certify the alignment of support bar 54 with centerline 52 of block 40.

Accordingly, the improved loadwheel alignment fixture is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved loadwheel alignment fixture is constructed and used, the characteristics of the construction, and the advantageous, new and useful results obtained; the new and useful structures, devices, elements, arrangements, parts, and combinations, are set forth in the appended claims.

What is claimed is:

1. In a tire uniformity machine of the type having a spindle with spaced first and second chucks for rotatably mounting a tire therebetween, said tire to be tested by engagement with a loadwheel rotatably mounted independent of and spaced from the spindle, and in which the first chuck has a nose cone sleeve formed with a conical-shaped recess and the second chuck has a conical-shaped nose cone; wherein the improvement comprises a fixture for checking the alignment of the loadwheel with respect to the centerline of the spindle including:
   (a) an adaptor block having a conical-shaped projection on one end of the block and a conical-shaped recess formed in an opposite end of said block, said projection being complementary to and adapted to be inserted into the conical-shaped recess of the first chuck with said conical-shaped recess being complementary to and adapted to receive the nose cone of the second chuck when said chucks are moved towards each other to align a centerline of the adaptor block with the centerline of the spindle;

(b) a support bar mounted on the adaptor block and extending parallel with the centerline of the adaptor block; and (c) sensor means mounted on the bar for engaging the loadwheel to measure the alignment of said loadwheel with respect to the centerline of the spindle.

2. The machine defined in claim 1 in which the sensor means include a pair of sensors mounted in a spaced relationship on the bar; and in which said sensors engage smooth surfaces of the loadwheel adjacent the edges of said loadwheel to measure the parallelism of said loadwheel with respect to the centerline of the spindle.

3. The machine defined in claim 2 in which the sensor means are electronic digital indicators.

4. The machine defined in claim 1 in which the bar is rigidly attached to the adaptor block by a support arm extending outwardly from the adaptor block perpendicularly to the centerline of said block.

5. The machine defined in claim 1 in which the adaptor block has a flat surface parallel to the centerline of said block; and in which the bar has a flat outer surface parallel to said flat surface of the adaptor block.

6. The machine defined in claim 1 in which the sensor means includes a sensor having an element engageable with the peripheral edge of the loadwheel for measuring the squareness of said loadwheel with respect to the centerline of the spindle.

7. The machine defined in claim 6 in which the sensor is mounted on a rod; and in which said rod extends through a hole formed in the support bar and extends outwardly from said bar perpendicularly with respect to the centerline of the adaptor block.

8. The machine defined in claim 1 in which a slide rod is mounted on the support bar and extends parallel therewith; in which the sensor means includes a sensor which is movably mounted on said slide rod; and in which said sensor is adapted to contact a coated load surface of the loadwheel at a plurality of positions to measure the profile of said coated load surface.

9. The machine defined in claim 8 in which the sensor is a LVDT.

10. The machine defined in claim 1 in which the sensor means is a pair of sensors; and in which a plurality of holes are formed in the support bar for selectively mounting said pair of sensors at spaced locations thereon.

11. The machine defined in claim 1 in which the adaptor block and support arm are mounted on a sled for movement of the adaptor block between the first and second chucks of the machine spindle.

12. The machine defined in claim 11 in which the sled has a pair of spaced runners and a pair of aligned spaced supports extending upwardly from said runners; and in which a pair of rods are connected to the adaptor block and extend outwardly therefrom and engage the spaced supports to removably mount the machine on the sled.

13. The machine defined in claim 12 in which the sled includes a cross member extending between the pair of runners; and in which the support bar engages the cross member to further mount the machine on the sled.

14. The machine defined in claim 12 in which the spaced supports are formed with recesses; and in which the horizontal rods seat in said recesses to removably mount the fixture on the sled.

15. The machine defined in claim 1 in which the adaptor block is a one-piece member having a generally cylindrical base formed with opposite flat side surfaces and top and bottom surfaces; and in which the conical-shaped recess is formed in said block and extends upwardly from the bottom surface thereof; and in which the conical-shaped projection extends upwardly from the top surface of said block.

16. The machine defined in claim 15 in which a plate is attached to one of the flat side surfaces of the adaptor block; and in which the support bar is rigidly mounted on the block by a support arm attached to said block and extending perpendicularly outwardly therefrom.

17. In a tire uniformity testing machine of the type having a spindle and a pair of spaced moveable chucks, and a rotatable member spaced from the spindle, wherein said chucks have surfaces; wherein the improvement comprises moveable block means adapted to be removably clamped between the chucks for checking the alignment of the spindle with respect to said rotatable member, said block means having a pair of surfaces, each engageable with a corresponding surface on each of the respective chucks for automatically aligning said block means in a predetermined position with respect to the spindle upon closing of the chucks; and sensor means mounted on the block means for contacting the spaced rotatable member to measure the alignment of said member with respect to the spindle.

18. The machine defined in claim 17 in which the block means is removably mounted on a sled for moving said block means between the spaced chucks.

19. The machine defined in claim 17 in which the pair of surfaces include an inwardly extending recess and a sloped outwardly extending projection.

20. The machine defined in claim 17 in which the pair of surfaces of the block means is a lower conical-shaped recess vertically aligned with an upper conical-shaped projection; and in which the centerline of said recess and projection aligns with the centerline of the spindle to form a common centerline.

21. The machine defined in claim 20 in which a bar is mounted on the block in a spaced parallel relationship with respect to the common centerline of the block means.

22. The machine defined in claim 21 in which a plurality of spaced holes are formed in the bar for mounting the sensor means thereon for engaging the rotatable member at at least two contact points.

23. The machine defined in claim 22 in which the block means is a hardened metal block having at least one flat side surface parallel to the centerline of the block; and in which the bar has a flat surface parallel with said flat block surface for certifying the alignment of the sensor means with respect to the centerline of the block.

24. In a tire uniformity machine of the type having a vertical spindle assembly, a chuck assembly having a pair of vertically spaced rims with a nose cone mounted on one of the rims and a nose cone sleeve mounted on the other rim, and a loadwheel rotatably mounted independent of and spaced from the spindle assembly; an improvement comprising an alignment fixture removably clamped between the nose cone and nose cone sleeve, said fixture having an adaptor block formed with a conical-shaped recess and an aligned conical-shaped projection complementary to the nose cone and the nose cone sleeve, respectively; a sensor mounting bar extending parallel to a common centerline of said recess and projection; and a pair of sensor means mounted on the bar for engaging spaced surface of the loadwheel to measure the parallelism of said loadwheel with respect to the spindle.

25. The tire uniformity machine defined in claim 24 in which the bar is mounted on the block by an arm extending perpendicularly outwardly from said block perpendicularly with respect to the centerline of the block.

26. The tire uniformity machine defined in claim 24 in which the machine is removably mounted on a sled for placement between the nose cone and nose cone sleeve of the chuck assembly.

27. The tire uniformity machine defined in claim 24 in which a slide rod is mounted on the sensor mounting bar and parallel thereto; and in which a transducer is adjustably mounted on the slide rod for measuring the profile of a coated surface of the loadwheel.

28. The tire uniformity machine defined in claim 24 in which the pair of sensor means are indicating gauges which engage smooth surfaces adjacent the edges of the loadwheel.

* * * * *